Nov. 25, 1924.
W. H. McALLISTER
1,517,082
CASTER AND METHOD OF MAKING SAME
Filed Aug. 16, 1921
2 Sheets-Sheet 1
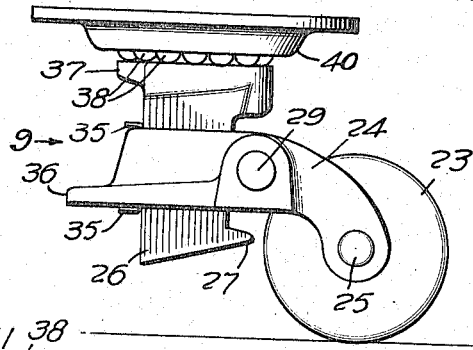
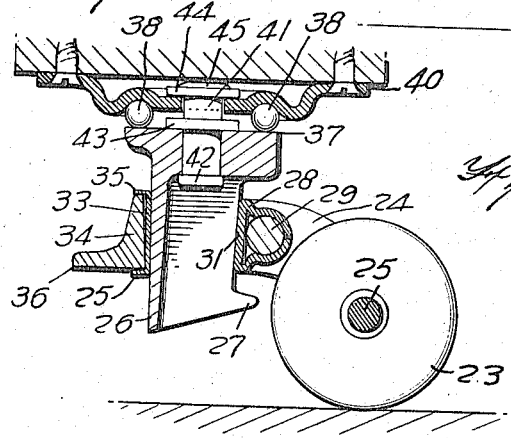
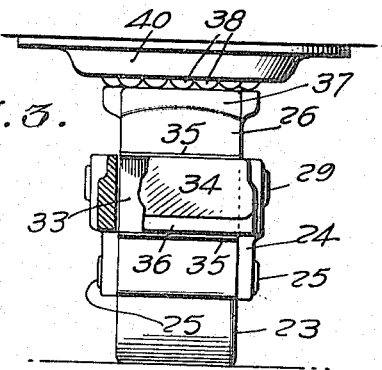
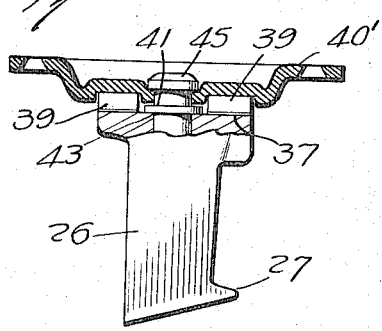
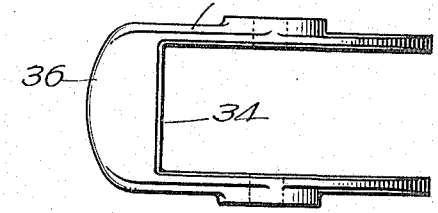
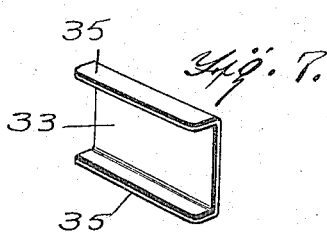
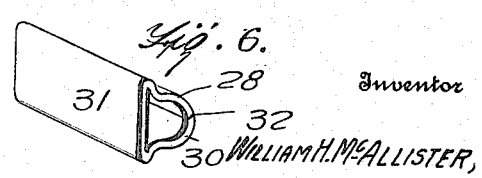
Inventor
WILLIAM H. McALLISTER,
By Franklin H. Hough
Attorney

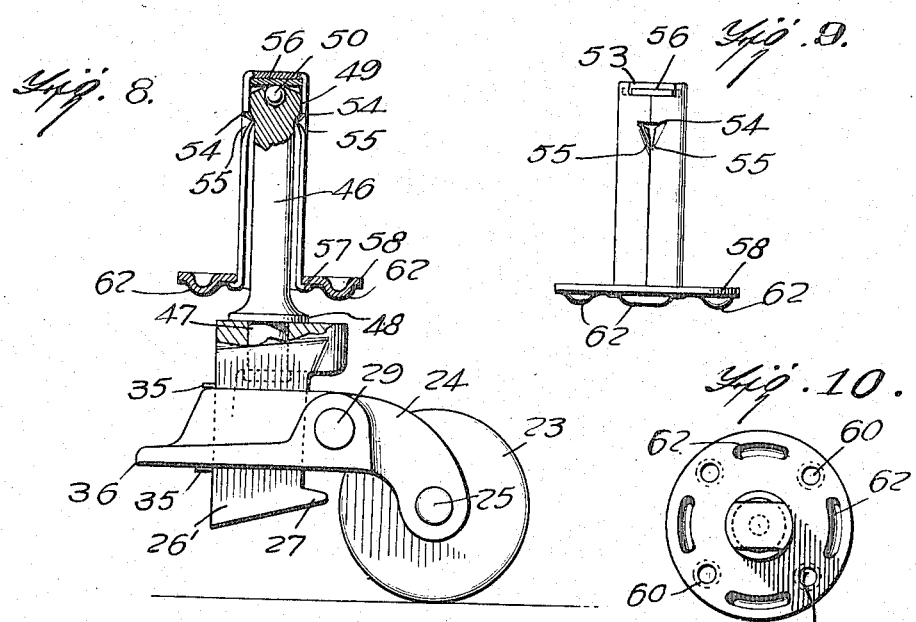
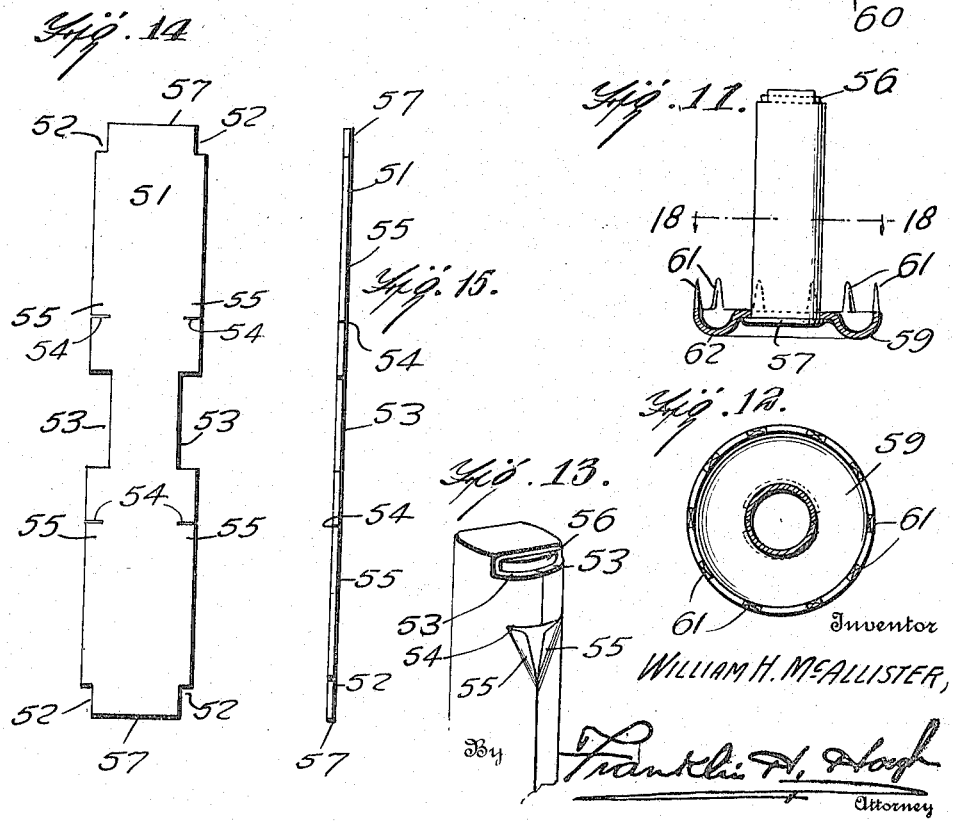

Patented Nov. 25, 1924.

1,517,082

UNITED STATES PATENT OFFICE.

WILLIAM H. McALLISTER, OF LINDEN, PENNSYLVANIA.

CASTER AND METHOD OF MAKING SAME.

Application filed August 16, 1921. Serial No. 492,837.

*To all whom it may concern:*

Be it known that I, WILLIAM H. McALLISTER, a citizen of the United States, residing at Linden, in the county of Lycoming and State of Pennsylvania, have invented certain new and useful Improvements in Casters and Methods of Making Same, of which the following is a specification, reference being had therein to the accompanying drawings.

This invention relates to casters for furniture or the like, and has for an object to provide a new and improved caster embodying elements of construction whereby the device becomes economical to manufacture and reliable in action.

A further object of the invention is to provide an improved form of adjustable caster wherein the wheel carrying part and the furniture engaging part are adjustable relative to each other and compensate for differences in the height of the leg or other part of the furniture from the floor.

A further object of the invention is to provide a caster having a socket member with a furniture-engaging flange provided with means for engaging the floor when the caster and spindle are removed, to prevent tearing carpets, scratching floors, or other injurious effects.

A further object of the invention is to provide a caster having an improved type of spindle for engaging the socket for ease of castering as the direction of movement changes.

A further object of the invention is to provide an improved type of ball-bearing for connecting a platform type of caster with the platform supporting the furniture.

With these and other objects in view the invention comprises certain novel units, parts, elements, combinations, functions, arrangements and mechanical movements as disclosed in the drawings, together with mechanical equivalents thereof, as will be hereinafter more fully described and claimed.

In the drawings:

Figure 1 is a sectional view through the caster of the platform type with the wheel mounted therein, shown at Figures 1 to 6 inclusive;

Figure 2 is a view of the platform type of caster in side elevation;

Figure 3 is a view of the platform type of caster in end elevation, as indicated by arrow 9 in Figure 8, parts being broken away;

Figure 4 is a fragmentary view in side elevation of the boss showing the platform in diametrical section and a roller race as distinguished from the ball race shown in Figures 1 to 3 inclusive;

Figure 5 is a top plan view of the yoke;

Figure 6 is a perspective view of the detent;

Figure 7 is a perspective view of the wear member;

Figure 8 is a view, partly in side elevation and partly in section, of the spindle type of caster;

Figure 9 is a view of the socket for the spindle removed from the spindle and seen in side elevation;

Figure 10 is a view of the socket shown at Figure 15 in inverted plan;

Figure 11 is a view in side elevation of a modified type of socket;

Figure 12 is a view of the socket member shown at Figure 11 taken on line 18—18;

Figure 13 is a perspective view of the top of the socket showing the wear washer retained therein;

Figure 14 is a view in side elevation of the blank from which the socket is made, and Figure 15 is a view of the socket blank shown in edge elevation.

Like characters of reference indicate corresponding parts throughout the several views.

The caster which forms the subject matter of this application may be provided with any approved type of caster wheel, indicated in the several drawings at 23.

This wheel 23 is journaled in a yoke 24 in the platform type of caster by a pintle 25. The yoke 24 surrounds and embraces a post 26 having an approximately uniform transverse dimension with a stop 27 at the bottom to prevent displacement of the yoke from the post. A detent 28 is introduced between the arms of the yoke and is maintained in position by means of a pin 29. The detent is moved upon the pin 29 so as to grip the post 26 to maintain the yoke in position relative to such post as adjusted. While the detent may be varied as to make-up it preferably embodies a substantially tubular portion 30 for embracing the pin 29 with a flattened portion 31 engaging against the edges of the post and is preferably constructed of sheet metal bent as an integral member with the edges abutting as at 32.

Opposite the detent a wear plate 33 is introduced between the bar 34 of the yoke and the post, such wear member being a plate of material having flanges 35 properly positioned to engage the top and bottom of such bar 34. The yoke is provided with an extension 36 under which the toe of the foot may be inserted to lift the rear end of the yoke for the purpose of adjustment of the yoke upon the post.

The upper end of the post is provided with a substantially plane surface 37 upon which are positioned balls 38 or rollers 39. The balls 38 or rollers 39 are held in position to rotate upon this plane surface 37 by means of the platform 40 or 40', the former being arranged for a ball race, the latter for the roller race. From an examination of Figures 1 and 4 the differences in the conformation of the platforms to meet the requirements of the anti-friction members will be perfectly apparent. The platform is held in position by means of a rivet 41 which is rigidly connected with the post in any approved manner, as by upsetting at 42, having an annular shoulder 43 bearing upon the top of the plane surface 37, extending upwardly through a central perforation in the platform and provided with a washer 44 held in position by upsetting, as at 45.

In the spindle type of caster the post 26' is arranged to engage the yoke 24 in exactly the same manner as shown at Figures 1 to 3 inclusive. Instead of employing the rivet 41 a spindle 46 is secured to the post by forming a reduced portion 47 inserted through the opening in the top of the post and secured by upsetting the end, an annular shoulder 48 being provided to bear upon the top of the post. The spindle is an approximately straight pintle having an enlarged head 49 into the top end of which a ball 50 is inserted.

A socket for the spindle is provided to correspond to the furniture or other article to which it is to be attached, one type being shown at Figure 9 and one type at Figure 11, it being understood, of course, that the accessories accompanying this socket will not limit it to those shown in the two figures. The socket is made up from a blank indicated at Figures 14 and 15, comprising a plane piece of metal 51 having its corners cut out at 52, with cut-outs 53 substantially midway the ends. There are also slits 54 forming corners 55.

This blank is rolled to the form shown at Figures 9, 11 and 13 so that the corners 55 are bent inwardly, as shown more particularly at Figures 8 and 13, to engage under the enlarged head 49 of the spindle when inserted into the socket. The cut-out 53 is provided to engage a wear disk 56 against which the ball 50 engages when the spindle is in position and to prevent the wearing of the ball through the material of the socket which may be of light gauge and soft, the disk being of harder material resisting wear.

The cut-outs 52 provide flanges 57 which are expanded to clinch about the inner periphery of the plate 58 or 59, forming the complete socket member, as shown at Figures 9 or 11. The plate 58 is provided with screw holes 60, by which the socket is maintained in position inserted in a boring formed in the furniture, while the plate 59 is provided with prongs 61 to be driven into the furniture to maintain the device in position in lieu of screws inserted through the screw holes 60. Either type of plate 58 or 59 has portions stamped downwardly at 62 below the crimped or clinched flanges 57 so that when the caster is removed from the socket member, the plate 58 or 59 presents a smooth wearing surface to slide without tearing over carpets and without scratching over floors.

With either type an adjustable caster is provided which operates as follows. When pressure is applied by the weight of furniture to the caster, the device grips the post in the manner shown at Figure 1, the detent clamping tightly against the side opposite the wear member 33. When an adjustment is to be made, the end of the yoke 24 opposite the detent is raised by engagement under the toe 36 which engagement may be by any approved means, as by inserting the toe of the shoe under this toe piece 36 and lifting. This disengages the grip upon the post, whereupon the yoke may slide either up or down as occasion may require to compensate for unevenness of structure, and when the proper adjustment is attained, maintain such adjustment until again released. It is believed that the other parts and their operation will be thoroughly understood from the foregoing description.

What I claim is:

1. A caster comprising a post having approximately parallel sides, a yoke slidable vertically upon the post and provided with a caster journal, a pin carried by the yoke, a detent movable upon the pin and presenting a flat surface to the post, and a wear member interposed between the yoke and the side of the post opposite the detent.

2. A caster comprising a rigid post having approximately parallel sides and a stop, a yoke slidable vertically upon the post and having arms curved downwardly to a caster journal, a pin spanning the yoke between the post and the caster journal, a detent mounted upon the pin and movable thereon and presenting a substantially flat gripping surface to the post, and a wear member interposed between the post and the yoke opposite the detent.

3. A caster comprising a rigid post open at one side presenting spaced edges, all of said sides and edges being approximately in parallelism, a yoke mounted to slide vertically upon the post and extending into spaced arms providing for a caster journal, a pin extending approximately across the yoke between the post and the caster journal, a detent mounted to swing upon the pin and presenting a substantially flat gripping surface to the spaced edges of the post, and a wear member interposed between the yoke and the side of the post opposite the spaced edges.

4. A caster comprising a rigid post having substantially parallel sides, a castering member extending vertically from the post, means to connect the castering member with an article of furniture, a yoke embracing the rigid post and slidable vertically thereon and terminating in downwardly-turned caster journal extremities, a detent D-shaped in cross section carried by the yoke appropriately proportioned to grip with the straight side of the D against one side of the post, and a wear strip inserted between the yoke and the side of the post opposite the detent.

5. A caster comprising a post, a yoke slidable upon the post, a pin inserted through the yoke and spaced normally from the post and a detent mounted upon the pin, D-shaped in transverse section having the straight side of the D bearing against the post.

In testimony whereof I hereunto affix my signature.

WILLIAM H. McALLISTER.